INVENTOR
D. E. THOMAS
BY R. B. Andis
ATTORNEY

Oct. 9, 1962 D. E. THOMAS 3,058,064

ESAKI DIODE NEGATIVE RESISTANCE CURVE TRACER

Filed Feb. 1, 1960 2 Sheets-Sheet 2

INVENTOR
D. E. THOMAS
BY R. B. Ardis
ATTORNEY 3,058,064

ESAKI DIODE NEGATIVE RESISTANCE CURVE TRACER

Donald E. Thomas, Madison, N.J., assignor to Bell Telephone Laboratories, Incorporated, New York, N.Y., a corporation of New York Filed Feb. 1, 1960, Ser. No. 5,773
9 Claims. (Cl. 324—158)

This invention relates generally to the measurement of electrical parameters of two-terminal devices and more particularly, although in its broader aspects not exclusively, to the measurement of voltage-current characteristics of such negative resistance devices as the so-called Esaki diode.

The Esaki effect was announced by Leo Esaki in a letter to the editor appearing in the January 15, 1958, issue of The Physical Review and manifests itself as a negative resistance of the short-circuit stable type in the forward conduction characteristics of a heavily doped semiconductor junction diode. The resulting gain covers an extremely broad frequency range extending into the kilomegacycle region. Diodes exhibiting such a characteristic have come to be known in the art both as Esaki diodes and as tunnel diodes. The term Esaki diode will, however, be used exclusively in the present application.

One object of the present invention is to permit easy measurement of the forward conducting characteristic of an Esaki diode.

Another and more particular object is to permit the forward voltage-current characteristic of an Esaki diode to be displayed accurately in two-dimensional form.

Still another object is to avoid either continuous-wave or relaxation oscillations during measurements of the forward conducting characteristic of an Esaki diode.

An important feature of the invention provides D.-C. stability during measurement of the forward conducting characteristic of an Esaki diode. As a result, the voltage-current characteristic of the diode can be traced accurately on either a cathode-ray oscilloscope or a pen-type X—Y recorder without the skips or jumps which would otherwise tend to occur. In accordance with this feature of the invention, a stabilizing resistor having a resistance less than the minimum value of negative resistance exhibited by the diode is connected in shunt across the Esaki diode.

An important limitation on the minimum value of the stabilizing resistor featured by the invention provides A.-C. stability during the measuring process without detracting from the D.-C. stability afforded by the stabilizing resistor. Both continuous-wave and relaxation oscillations are guarded against, since either would make accurate display of the voltage-current characteristic impossible. In accordance with this A.C. stability criterion, the stabilizing resistor connected in parallel with the Esaki diode under test has a resistance greater than the quantity $$\frac{L}{RC}$$

where R is the minimum value of negative resistance exhibited by the diode in its forward conducting characteristic, L is the series inductance of the circuit connecting the stabilizing resistor to the diode, and C is the junction capacity of the diode. The connecting leads of the stabilizing resistor are, in accordance with a closely related feature, kept as short as possible in order to provide the greatest possible permissible resistance range for the stabilizing resistor while still assuring both D.-C. and A.-C. stability.

Another important feature of the invention permits the current through an Esaki diode to be read directly, as a linear function of voltage, even though provision of D.-C. and A.-C stabilization prevents the current through the diode from being measured independently of the current through the shunt stabilizing resistor. In accordance with this feature of the invention, a current-measuring resistor is connected in series with the Esaki diode and a source of measuring potential, a voltage proportional to the source current flowing through the current-measuring resistor but shunted around the diode is derived, and the derived voltage is subtracted electrically from the voltage appearing across the current-measuring resistor. The resultant voltage is directly proportional to the current flowing through the diode alone and may be displayed or recorded, along with the voltage appearing across the diode, to show the voltage-current characteristic of the diode.

A more complete understanding of the invention, its objects, and its features may be obtained from the following detailed description. In the drawings.

Figure 1:
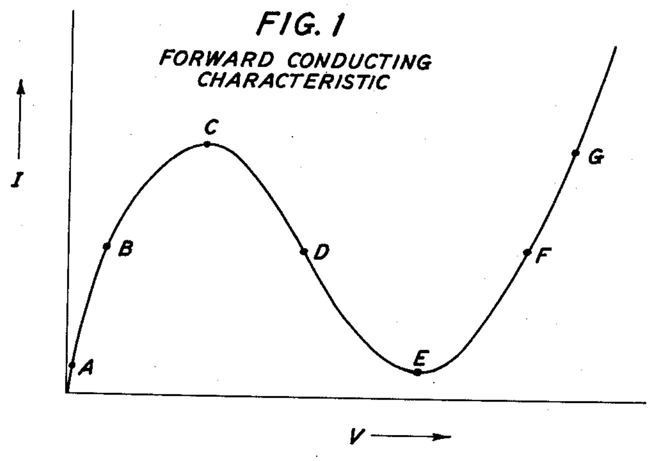
FIG. 1 illustrates the forward voltage-current characteristic of a typical Esaki diode.

As illustrated in FIG. 1, the forward conducting characteristic of an Esaki diode differs from that of an ordinary diode in that it contains a negative resistance region. This negative resistance is of the type commonly referred to as short-circuit stable. As illustrated, the dynamic forward resistance $$\frac{dV}{dI}$$

starts out low at small voltage values and increases rapidly until it become infinite at point C. The forward resistance then becomes negative and decreases in magnitude until it reaches its minimum value at approximately point D. From there it increases in magnitude again until it becomes infinite once more at point E. For still higher voltages, the forward resistance becomes positive again and decreases in magnitude until it becomes fairly steady at points F and G.

The difficulty in measuring the voltage-current characteristic of such a device arises from the fact that at diode currents between the currents at which the forward resistance is infinite, the terminal voltage for a given magnitude of forward current is multivalued. Thus, at points B, D, and F, three possible voltages exist for a single current. When an attempt is made to trace such a voltage-current characteristic on a cathode-ray oscilloscope or an X—Y recorder using a power supply of the constant current type (i.e., one whose impedance is high in comparison with that of the load it is driving) to drive the diode, the constant current power supply does not allow the current to decrease after the current reaches its maximum value at point C. The voltage, therefore, moves out to point G, the exact voltage-current path followed, depending upon the transient response of the diode and the power supply. Similarly, when the current is reduced to its minimum value at point E, the voltage across the diode shifts to point A. As a result, the characteristic traced is not that shown in FIG. 1 but resembles a hysteresis loop, the shape of which depends upon the transient response of the power supply and the measuring equipment.

The type of D.-C. voltage-current characteristic exhibited by Esaki diodes and illustrated in FIG. 1 is similar in its shape to D.-C. negative resistance regions found in the collector voltage-current characteristics of some point contact transistors. Since point contact transistors were considered to be open-circuit stable and were originally measured with constant current power supplies both in the emitter and collector circuits, the same difficulty was encountered in tracing true collector voltage-current characteristics. As pointed out in the present inventor's prior Patent 2,896,168, issued July 21, 1959, the solution to the problem involves use of a power supply of the constant voltage type in the collector circuit. Since it is essential to keep the impedance of the power supply low in comparison with that of the transistor collector-base path at all frequencies at which the transistor has gain, a large capacitor is, in addition, connected between collector and base terminals. The capacitor is located in as close physical proximity to the collector and base terminals as possible in order to avoid serious parasitic lead inductance.

With such a background in the prior semiconductor art, it might be expected that tracing the forward voltage-current characteristic of an Esaki diode would not prove particularly difficult. Such, however, is not the case. The Esaki diode has a frequency potential which is measured in kilomegacycles, as compared with point contact transistor frequencies measured in hundreds of megacycles. The upper frequency cut-off of the Esaki diode negative resistance has, in fact, not yet been determined with any degree of exactitude. The solution to the collector voltage-current measuring problem in the transistor art will not, therefore, suffice in the Esaki diode art. Even the short lead lengths of the capacitors used to assure a low source impedance over a broad frequency range would introduce sufficient inductance to make self oscillation likely at the higher frequencies of Esaki diode response.

Figure 2:
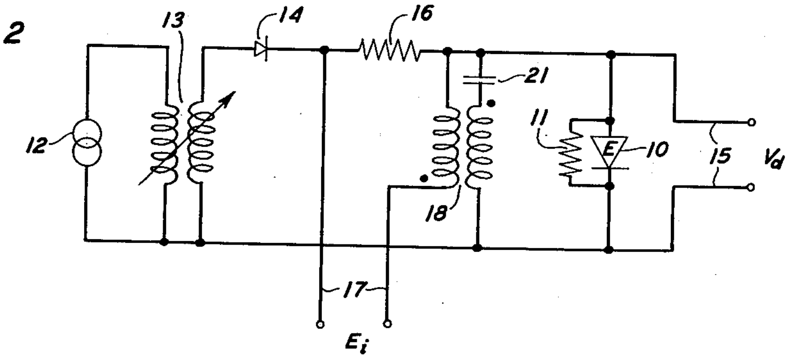
FIG. 2 illustrates an embodiment of the invention particularly adapted to display the forward voltage-current characteristic of an Esaki diode on the screen of a cathode-ray oscilloscope.

The present invention takes a different approach towards solution of the measuring problem in Esaki diodes. FIG. 2 is a schematic diagram of an embodiment of the invention arranged to display the forward voltage-current characteristic of an Esaki diode on the screen of a cathode-ray oscilloscope. As shown in FIG. 2, the Esaki diode 10 which is to be measured has a stabilizing resistor 11 connected directly across it. Resistor 11 has a resistance less than the minimum value of negative resistance exhibited by Esaki diode 10 and is small enough to be placed in such close proximity to diode 10 that the series inductance of its leads is kept very small. Since there is some lead inductance, however, there is still the possibility of either continuous-wave or relaxation oscillations unless one further condition is met. For this reason, stabilizing resistor 11 has a minimum as well as a maximum permissible value. Its resistance is greater than the quantity $$\frac{L}{RC}$$

where R is the minimum value of diode negative resistance, L is the series inductance of the leads connecting resistor 11 to diode 10, and C is the junction capacity of diode 10. Since the maximum permissible resistance of resistor 11 for D.-C. stability is R, as stated above, and since C is relatively high because of the heavy doping levels required to produce the Esaki effect, the maximum permissible value thus placed on L is difficult to meet. For this reason, it is important that stabilizing resistor 11 be as close physically to diode 10 as possible in order to keep its leads short.

In order to display the forward voltage-current characteristic of Esaki diode 10 on the screen of a cathode-ray oscilloscope, the arrangement of FIG. 2 is driven from a 60-cycle A.-C. potential source 12. Potential source 12 is connected across Esaki diode 10 by means of a variable-voltage transformer 13 and a rectifying diode 14. Diode 14 is poled to pass current only in the forward direction of Esaki diode 10. A pair of voltage output terminals 15 are connected across Esaki diode 10 to measure the Esaki diode voltage $V_d$. This voltage may be applied to one set of deflection plates of a cathode-ray oscilloscope for display of the voltage-current characteristic.

If space permitted, normal practice in obtaining a voltage proportional to the current flowing through Esaki diode 10 would be to connect a current-measuring resistor 16 in series with diode 10 within the path shunted by stabilizing resistor 11 and to connect a pair of output terminals 17 across it to provide a voltage $E_i$ proportional to the current flowing through Esaki diode 10. With stabilizing resistor 11 as close to Esaki diode 10 as necessary to assure A.-C. stability, however, it is impossible to connect current-measuring resistor 16 between Esaki diode 10 and stabilizing resistor 11. Current-measuring resistor 16 is, therefore, connected in series with both Esaki diode 10 and stabilizing resistor 11, as shown in FIG. 2.

When connected in series with Esaki diode 10 and stabilizing resistor 11, however, the voltage across current-measuring resistor 16 is proportional to the sum of the currents flowing in both elements. In accordance with another feature of the invention, therefore, a phase-inverting transformer 18, having its turns ratio equal to $R_{16}/R_{11}$, is used to derive a voltage proportional to the current flowing through stabilizing resistor 11 and subtract it from the voltage appearing across current-measuring resistor 16, where $R_{16}$ is the resistance of current-measuring resistor 16 and $R_{11}$ is the resistance of stabilizing resistor 11. The primary winding of transformer 18 is connected in parallel with both stabilizing resistor 11 and Esaki diode 10 and the secondary winding is connected between the end of current-measuring resistor 16 nearest Esaki diode 10 and one of the output terminals 17. A D.-C. blocking capacitor 21 is connected in series with the primary winding of transformer 18. Output terminals 17 may be connected to the other pair of deflection plates of a cathode-ray oscilloscope to provide a display of the Esaki diode voltage-current characteristic. The transmission and phase of transformer 18 are made flat from 60 cycles to a sufficiently high harmonic of 60 cycles to transmit faithfully the approximate half-wave waveform of the voltage $V_d$.

The embodiment of the invention illustrated in FIG. 2 provides an accurate display of the forward voltage-current characteristic of an Esaki diode on the screen of a cathode-ray oscilloscope with a minimum of circuit complications while avoiding both continuous wave and relaxation oscillations. It may, however, be difficult to adjust the turns ratio of transformer 18 to provide the ratio $R_{16}/R_{11}$. The embodiment of the invention shown in FIG. 3 may be used as an alternative. There, the circuitry is identical to FIG. 2 except that a resistor 19 is connected across the primary winding of transformer 18 and a variable resistor 20 is connected between the primary winding and the cathode of Esaki diode 10. When the resistance of variable resistor 20 has the value given by the expression $$R_{20}=\frac{aR_{11}R_{19}}{R_{16}}-R_{19}-R_{11} \qquad (1)$$

where $a$ is the turns ratio of transformer 18 and $R_{19}$ is the resistance of resistor 19, the voltage between output terminal 17 is proportional to the current flowing through Esaki diode 10 alone.

Figure 3:
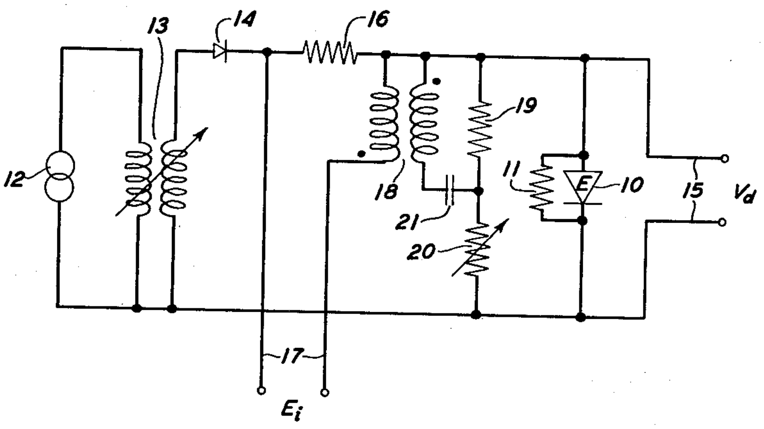
FIG. 3 shows a variation of the embodiment of the invention illustrated in FIG. 2.

While the embodiments of the invention illustrated in FIGS. 2 and 3 serve to display Esaki diode voltage-current characteristics on the screen of a cathode-ray oscilloscope, a somewhat different technique is needed before they can be plotted on an X—Y recorder. Such a device generally plots a two-dimensional curve directly on a sheet of graph paper. One axis of the curve is controlled by the horizontal position of a recording pen, while the other is controlled by the vertical position. For a voltage-current characteristic to be traced by such a device, D.-C. driving voltage proportional to the voltage and current to be recorded must be derived. The embodiment of the invention shown in FIG. 4 provides such voltages.

Figure 4:
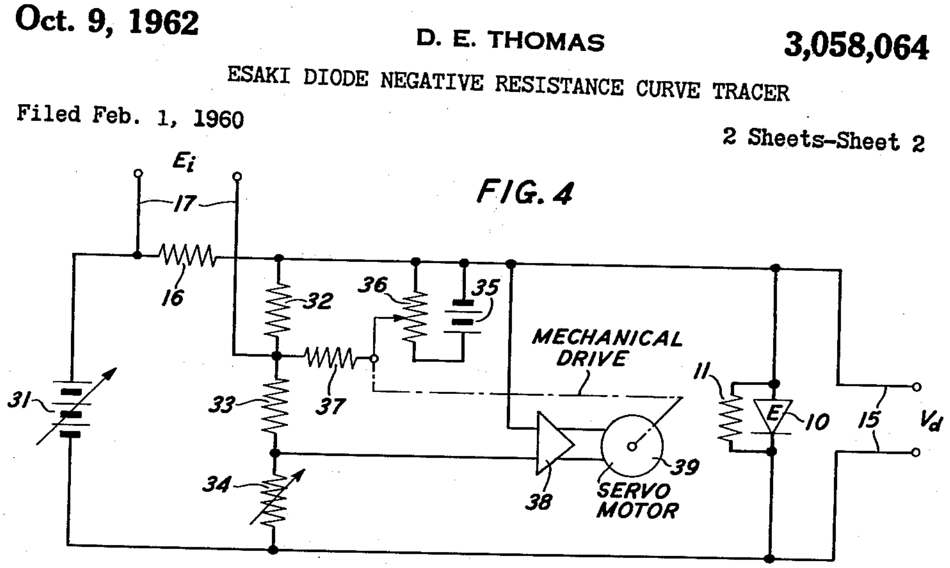
FIG. 4 illustrates an embodiment of the invention adapted to display the forward voltage-current characteristic of an Esaki diode on a pen-type X—Y recorder.

In the embodiment of the invention illustrated in FIG. 4, stabilizing resistor 11 is connected in parallel with and in close physical proximity to Esaki diode 10, as before. Also, as before, stabilizing resistor 11 has a resistance value less than R but greater than $$\frac{L}{RC}$$

where R is the minimum value of negative resistance exhibited by Esaki diode 10, L is the series inductance of the leads connecting resistor 11 to diode 10, and C is the junction capacity of diode 10. Voltage output terminals 15 are connected directly across Esaki diode 10 and stabilizing resistor 11.

The circuit shown in FIG. 4 differs from those shown in FIGS. 2 and 3 principally in that it provides a variable D.-C. driving source 31 for Esaki diode 10 and is arranged for automatic tracing of the diode voltage-current characteristic by an X—Y recorder. Source 31 is connected in series with current-measuring resistor 16 across the parallel combination of Esaki diode 10 and stabilizing resistor 11. Source 31 is poled to transmit current through Esaki diode 10 in the forward direction. As before, the required close physical proximity of stabilizing resistor 11 and Esaki diode 10 makes it impossible to insert current-measuring resistor 16 in series with Esaki diode 10 alone. When connected in series with both diode 10 and resistor 11 as shown, however, the voltage across current-measuring resistor 16 is proportional to the sum of the currents flowing through diode 10 and stabilizing resistor 11. For this reason, the illustrated embodiment of the invention includes apparatus for subtracting a voltage proportional to the stabilizing resistor current from the voltage across current-measuring resistor 16 to produce a resultant voltage proportional to the current flowing in Esaki diode 10 alone.

In FIG. 4, Esaki diode 10 is also shunted by a circuit path made up of a pair of fixed resistors 32 and 33 and a variable resistor 34, all connected in series. Resistor 32, which has one end connected to current-measuring resistor 16, is supplied with auxiliary power from a battery 35 through a potentiometer 36 and a series resistor 37. The resistance arm of potentiometer 36 is connected directly across battery 35 and has its movable contact connected through resistor 37 to the junction between resistors 32 and 33. The negative terminal of battery 35 is connected to current-measuring resistor 16. The input circuit of a D.-C. servo amplifier 38 is connected across resistors 32 and 33. The output of amplifier 38 drives a D.-C. servo motor 39 which controls the setting of potentiometer 36.

As a result of the currents supplied from variable D.-C. source 31 and battery 35, the potential drops across resistors 32 and 33 are opposite in polarity. The input to servo amplifier 38 is, therefore, the difference between those two potentials. Servo motor 39, then, drives the movable contact of potentiometer 36 to the point where the input to servo amplifier 38 is zero. When this occurs, $R_{32}I_{32}$ is equal to $R_{33}I_{33}$, where $R_{32}$ and $R_{33}$ are the resistances of resistors 32 and 33, respectively, $I_{32}$ is the current flowing through resistor 32, and $I_{33}$ is the current flowing through resistors 33 and 34.

When the current output terminals 17 are connected across the series combination of current-measuring resistor 16 and resistor 32, the voltage $E_1$ is given by the expression $$E_1=R_{16}(I_d+I_{11}+I_{33})-R_{33}I_{33} \qquad (2)$$

where $I_d$ is the current from source 31 flowing through

Esaki diode 10 and $I_{11}$ is the current flowing through stabilizing resistor 11. Rearranging terms, $$E_1=R_{16}I_d+R_{16}(I_{11}+I_{33})-R_{33}I_{33} \qquad (3)$$

If $R_{16}(I_{11}+I_{33})$ is made equal to $R_{33}I_{33}$ by adjustment of variable resistor 34, then the voltage at current terminals 17 is given by the expression $$E_1=R_{16}I_d \qquad (4)$$

and is linearly proportional to the current through Esaki diode 10. This is accomplished by removing Esaki diode 10 and adjusting variable resistor 34 at a value of $V_d$ near maximum until $E_1$ is equal to zero. $I_{11}$ and $I_{33}$ are linearly proportional as long as resistors 11 and 34 are unchanged during a characteristic tracing. Therefore, if $R_{16}(I_{11}+I_{33})$ and $R_{33}I_{33}$ are equal for one value of $V_d$, they are equal for all values of $V_d$ within the voltage range of the equipment. As a result, when output terminals 17 are connected to the current axis of an X—Y recorder, the recorder can, with proper choice of voltage scale and resistance value for current-measuring resistor 16, be made to read directly in $I_d$. $V_d$ is recorded directly by connecting the voltage axis of the recorder across voltage terminals 15. For any given Esaki diode, a trace like that shown in FIG. 1 is the result.

Theoretically, a large variety of combinations of resistance values for resistors 32, 33, and 34 will yield satisfactory results. In practice, however, it is convenient to make the resistance of resistor 34 considerably greater than that of stabilizing resistor 11, in which case the resistance of resistor 33 is also greater than that of current-measuring resistor 16, and to make the resistance of resistor 32 somewhat greater than that of current-measuring resistor 16. If $R_{33}$ is made equal to $bR_{16}$, where $b$ is considerably greater than unity, then $$\frac{I_{11}+I_{33}}{I_{33}}=\frac{R_{33}}{R_{16}}=b \qquad (5)$$

$$\frac{I_{33}}{I_{11}}=\frac{1}{b-1} \qquad (6)$$

and $$\frac{R_{34}}{R_{11}}=\frac{I_{11}}{I_{33}}=b-1 \qquad (7)$$

Variable resistor 34, therefore, should have a range of values equal to $(b-1)$ times the range of values expected from stabilizing resistor 11 for the Esaki diode to be measured.

Figure 5:
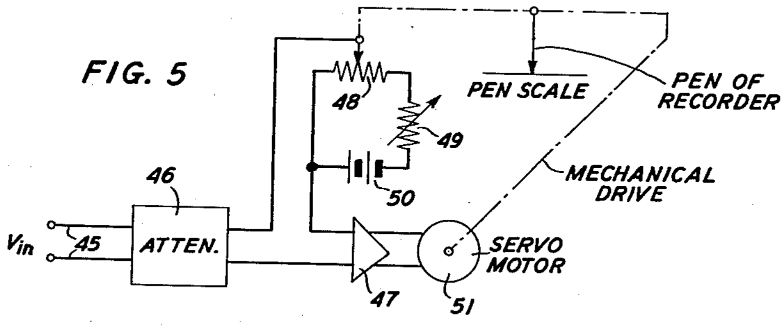
FIG. 5 shows the circuitry used to control one axis of a typical X—Y recorder.

If the X—Y recorder used for tracing the Esaki diode voltage-current characteristic has a follow-up potentiometer in its voltage axis, the auxiliary servo system shown in FIG. 4 can be eliminated and the follow-up potentiometer of the recorder can be used to subtract he shun current $I_{11}$. FIG. 5 is a schematic diagram of the circuit used in one axis of a typical X—Y recorder.

As shown in FIG. 5, the voltage input terminals 45 of an X—Y recorder are connected through an attenuator 46 to the input side of a D.-C. servo amplifier 47. In one side of the path between attenuator 46 and amplifier 47, however, there is a combination of a potentiometer 48, a variable resistor 49, and a D.-C. source or battery 50 which provides a reference potential opposite in polarity to the voltage at terminals 45. As illustrated, the resistance arm of potentiometer 48, resistor 49, and battery 50 is connected in a series loop, with the positive terminal of battery 50 also connected to amplifier 47. The movable contact of potentiometer 48 is connected to attenuator 46. The output side of amplifier 47 is coupled directly to a D.-C. servo motor 51 which drives both the movable contact of potentiometer 48 and the pen on the voltage scale of the recorder. The servo system drives the movable contact of potentiometer 48 until the input to amplifier 47 is zero or, in other words, until the voltage between the movable contact of potentiometer 48 and amplifier 47 is equal to the voltage across the output side of attenuator 46. Since the attenuation provided by attenuator 46 is known, the position of the contact and, hence, that of the recorder pen is a measure of $V_{in}$, the voltage applied to input terminals 45. When the proper scale factor is applied, the pen position therefore indicates the value of $V_{in}$.

Figure 6:
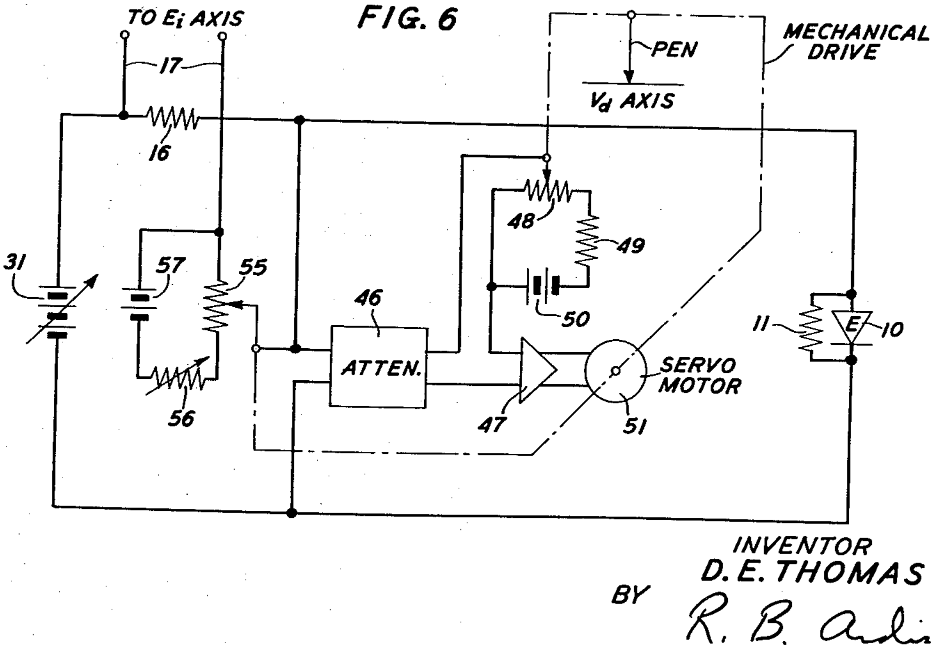
FIG. 6 illustrates a variation of the embodiment of the invention shown in FIG. 4 in which the control circuitry of one axis of an X—Y recorder is incorporated in the testing apparatus itself.

The embodiment of the invention shown in FIG. 6 is a modification of the Esaki diode negative resitsance curve tracer illustrated in FIG. 4 with the follow-up mechanism of the voltage axis of an X—Y recorder substituted for the separate servo system used in FIG. 4. In FIG. 6, Esaki diode 10 and stabilizing resistor 11 are connected as before, with D.-C. driving source 31 and current-measuring resistor 16 connected in series with the parallel combination of diode 10 and resistor 11. The voltage $V_d$ across Esaki diode 10 is fed directly to the voltage axis of the X—Y recorder and is recorded in terms of a pen position determined by the position of potentiometer 48, as described in connection with FIG. 5. In FIG. 6, however, an auxiliary follow-up potentiometer 55 is mechanically coupled to potentiometer 48 so that the resistance between one end of auxiliary potentiometer 55 and its movable contact is linearly proportional to the resistance between the corresponding end of potentiometer 48 and its pointer. A variable resistor 56 and an auxiliary battery 57 are connected in series across the resistance arm of potentiometer 55 and both the above-mentioned end of auxiliary potentiometer 55 and the positive terminal of auxiliary battery 57 are connected to one of the pair of current output terminals 17. The resistance of variable resistor 56 is made large in comparison with that of auxiliary potentiometer 55 and, as a result, the voltage between the movable contact of auxiliary potentiometer 55 and the appropriate one of current output terminals 17 is at all times proportional to $V_d$.

With the current axis of the recorder connected to terminals 17 in FIG. 6, the voltage applied to that axis is given by the expression $$E_i=R_{16}(I_d+I_{11})-E_{55} \qquad (8)$$

where $E_{55}$ is the voltage between the movable contact of auxiliary potentiometer 55 and the nearest current terminal, since the recorder draws substantially no current. The voltage $E_{55}$ is, in accordance with the invention, made equal to $R_{16}I_{11}$ by adjusting variable resistor 56. Under such conditions $$E_i=R_{16}I_d \qquad (9)$$

With the proper scale factor, $I_d$ is plotted directly on the current axis of the recorder. Then, when D.-C. supply source 31 is varied over the proper range, the recorder automatically plots the true forward voltage-current characteristic of the Esaki diode.

It is to be understood that the above-described arrangements are illustrative of the application of the principles of the invention. Numerous other arrangements may be devised by those skilled in the art without departing from the spirit and scope of the invention.

What is claimed is:

1. In an arrangement for measuring the electrical characteristics of a two-terminal device having negative impedance properties, a source of measuring potential, a current-measuring resistor, means connecting said device and said current-measuring resistor in series with said source, a stabilizing resistor connected in shunt across said device, means for deriving a voltage proportional to the current from said source flowing through said current-measuring resistor but shunted around said device, and means for subtracting said derived voltage from the voltage appearing across said current-measuring resistor, whereby said derived voltage compensates for the current drawn by said stabilizing resistor, leaving a resultant voltage proportional to the current flowing through said device alone.

2. In an arrangement for measuring the electrical characteristics of a two-terminal device having negative impedance properties, a source of measuring potential, a current-measuring resistor, means connecting said device and said current-measuring resistor in series with said source, a stabilizing resistor connected in shunt across said device, means for deriving a voltage substantially equal to the product of the resistance of said current-measuring resistor and the amount of current from said source shunted around said device, and means for subtracting said derived voltage from the voltage appearing across said current-measuring resistor, whereby said derived voltage compensates for the current drawn by said stabilizing resistor, leaving a resultant voltage proportional to the current flowing through said device alone.

3. In an arrangement for measuring the electrical characteristics of a two-terminal device having negative impedance properties, a source of measuring potential, a current-measuring resistor, means connecting said device and said current-measuring resistor in series with said source, a stabilizing resistor connected in shunt across said device, means for deriving a voltage substantially equal to the voltage across said device multiplied by the ratio of the resistance of said current-measuring resistor to the total resistance connected in shunt across said device, and means for subtracting said derived voltage from the voltage appearing across said current-measuring resistor, whereby said derived voltage compensates for the current drawn by said stabilizing resistor, leaving a resultant voltage proportional to the current flowing through said device alone.

4. In an arrangement for measuring the forward conducting characteristic of an Esaki diode, a source of measuring potential, a current-measuring resistor, means connecting said diode and said current-measuring resistor in series with said source, a stabilizing resistor connected in shunt across and in immediate proximity to said diode, said stabilizing resistor having a resistance less than the minimum value of negative resistance exhibited by said diode in its forward conducting characteristic, means for deriving a voltage proportional to the current from said source flowing through said current-measuring resistor but shunted around said diode, and means for subtracting said derived voltage from the voltage appearing across said current-measuring resistor, whereby said derived voltage compensates for the current drawn by said stabilizing resistor, leaving a resultant voltage proportional to the current flowing through said diode alone.

5. In an arrangement for measuring the forward conducting characteristic of an Esaki diode, a source of measuring potential, a current-measuring resistor, means connecting said diode and said current-measuring resistor in series with said source, a stabilizing resistor connected in shunt across and in immediate proximity to said dode, said stabilizing resistor having a resistance less than the minimum value of negative resistance exhibited by said diode in its forward conducting characteristic, means for deriving a voltage substantially equal to the product of the resistance of said current-measuring resistor and the amount of current from said source shunted around said diode, and means for subtracting said derived voltage from the voltage appearing across said current-measuring resistor, whereby said derived voltage compensates for the current drawn by said stabilizing resistor, leaving a resultant voltage proportional to the current flowing through said diode alone.

6. In an arrangement for measuring the forward conducting characteristic of an Esaki diode, a source of measuring potential, a current-measuring resistor, means connecting said diode and said current-measuring resistor in series with said source, a stabilizing resistor connected in shunt across and in immediate proximity to said diode, said stabilizing resistor having a resistance less than the minimum value of negative resistance exhibited by said diode in its forward conducting characteristic, means for deriving a voltage substantially equal to the voltage across said diode multiplied by the ratio of the resistance of said current-measuring resistor to the total resistance connected in shunt across said diode, and means for subtracting said derived voltage from the voltage appearing across said current-measuring resistor, whereby said derived voltage compensates for the current drawn by said stabilizing resistor, leaving a resultant voltage proportional to the current flowing through said diode alone.

7. In an arrangement for measuring the forward conducting characteristic of an Esaki diode, a source of measuring potential, a current-measuring resistor, means connecting said diode and said current-measuring resistor in series with said source, a stabilizing resistor connected in shunt across and in immediate proximity to said diode, said stabilizing resistor having a resistance less than R but greater than the quantity $$\frac{L}{RC}$$

where R is the minimum value of negative resistance exhibited by said diode in its forward conducting characteristic, L is the series inductance of the leads connecting said stabilizing resistor to said diode, and C is the junction capacity of said diode, means for deriving a voltage proportional to the current from said source flowing through said current-measuring resistor but shunted around said diode, and means for subtracting said derived voltage from the voltage appearing across said current measuring resistor, whereby said derived voltage compensates for the current drawn by said stabilizing resistor, leaving a resultant voltage proportional to the current flowing through said diode alone.

8. In an arrangement for measuring the forward conducting characteristic of an Esaki diode, a source of measuring potential, a current-measuring resistor, means connecting said diode and said current-measuring resistor in seires with said source, a stabilizing resistor connected in shunt across and in immediate proximity to said diode, said stabilizing resistor having a resistance less than R but greater than the quantity $$\frac{L}{RC}$$

where R is the minimum value of negative resistance exhibited by said diode in its forwad conducting characteristic, L is the series inductance of the leads connecting said stabilizing resistor to said diode, and C is the junction capacity of said diode, means for deriving a voltage substantially equal to the product of the resistance of said current-measuring resistor and the amount of current from said source shunted around said diode, and means for subtracting said derived voltage from the voltage appearing across said current-measuring resistor, whereby said derived voltage compensates for the current dawn by said stabilizing resistor, leaving a resultant voltage proportional to the current flowing through said diode alone.

9. In an arrangement for measuring the forward conducting characteristic of an Esaki diode, a source of measuring potential, a current-measuring resistor, means connecting said diode and said current-measuring resistor in series with said source, a stabilizing resistor connected in shunt across and in immediate proximity to said diode, said stabilizing resistor having a resistance less than R but greater than the quantity $$\frac{L}{RC}$$

where R is the minimum value of negative resistance exhibited by said diode in its forward conducting characteristic, L is the series inductance of the leads connecting said stabilizing resistor to said diode, and C is the junction capacity of said diode, means for deriving a voltage substantially equal to the voltage across said diode multiplied by the ratio of the resistance of said current-measuring resistor to the total resistance connected in shunt across said diode, and means for subtracting said derived voltage from the voltage appearing across said current-measuring resistor, whereby said derived voltage compensates for the current drawn by said stabilizing resistor, leaving a resultant voltage proportional to the current flowing through said diode alone.

References Cited in the file of this patent

UNITED STATES PATENTS 2,896,168 Thomas ---------------- July 21, 1959